United States Patent
Visser et al.

(10) Patent No.: US 10,106,267 B2
(45) Date of Patent: Oct. 23, 2018

(54) ENHANCING ENGINE PERFORMANCE TO IMPROVE FUEL CONSUMPTION BASED ON ATMOSPHERIC ICE PARTICLES

(71) Applicant: GE Aviation Systems LLC, Grand Rapids, MI (US)

(72) Inventors: Nicholas Visser, Grand Rapids, MI (US); Sridhar Adibhatla, Glendale, OH (US); David Michael Lax, Grand Rapids, MI (US)

(73) Assignee: GE Aviation Systems LLC, Grand Rapids, MI (US)

( * ) Notice: Subject to any disclaimer, the term of this patent is extended or adjusted under 35 U.S.C. 154(b) by 0 days.

(21) Appl. No.: 14/927,788

(22) Filed: Oct. 30, 2015

(65) Prior Publication Data

US 2017/0121028 A1     May 4, 2017

(51) Int. Cl.
| | |
|---|---|
| *B64D 31/06* | (2006.01) |
| *F01D 21/00* | (2006.01) |
| *G01S 13/95* | (2006.01) |
| *F02C 9/18* | (2006.01) |
| *F02C 9/00* | (2006.01) |
| *F02C 9/28* | (2006.01) |
| *F02C 9/52* | (2006.01) |

(Continued)

(52) U.S. Cl.
CPC ........... *B64D 31/06* (2013.01); *F01D 21/003* (2013.01); *F02C 9/00* (2013.01); *F02C 9/18* (2013.01); *F02C 9/28* (2013.01); *F02C 9/52* (2013.01); *G01S 13/953* (2013.01); *G01S 17/95* (2013.01); *B64D 2013/0618* (2013.01); *F05D 2270/096* (2013.01); *F05D 2270/311* (2013.01); *F05D 2270/313* (2013.01); *F05D 2270/805* (2013.01); *Y02A 90/18* (2018.01); *Y02A 90/19* (2018.01); *Y02T 50/56* (2013.01); *Y02T 50/671* (2013.01)

(58) Field of Classification Search
CPC ......... B64D 31/06; F01D 21/003; F02C 9/18; G01S 13/95
See application file for complete search history.

(56) References Cited

U.S. PATENT DOCUMENTS

| | | |
|---|---|---|
| 2,931,168 A | 2/1981 | Frank et al. |
| 4,710,095 A | 12/1987 | Freberg et al. |

(Continued)

OTHER PUBLICATIONS

Noel, Vincent, Journal of the Atmospheric Sciences, vol. 63, 2006, pp. 2978-2991.*

(Continued)

*Primary Examiner* — Jerrah Edwards
*Assistant Examiner* — Mathew Franklin Gordon
(74) *Attorney, Agent, or Firm* — GE Aviation Systems LLC; William Andes

(57) ABSTRACT

Systems and methods for enhancing engine performance based on atmospheric ice particles are provided. For example, a method can include selecting one or more points along a flight path of an aircraft and receiving a reflectivity measurement for each of the one or more points obtained using a device located on the aircraft. The method can further include determining an estimate of ice water content for each of the one or more points based at least in part on the reflectivity measurements; and controlling at least one component of the aircraft engine (e.g., a variable bleed valve) based at least in part on the estimate of ice water content for at least one of the plurality of points.

13 Claims, 5 Drawing Sheets

(51) Int. Cl.
*G01S 17/95* (2006.01)
*B64D 13/06* (2006.01)

(56) References Cited

U.S. PATENT DOCUMENTS

| | | | |
|---|---|---|---|
| 5,028,929 A | 7/1991 | Sand et al. | |
| 5,488,375 A * | 1/1996 | Michie | G01S 13/953 342/26 B |
| 5,546,183 A | 8/1996 | Fegley et al. | |
| 6,283,410 B1 | 9/2001 | Thompson | |
| 6,377,207 B1 | 4/2002 | Solheim et al. | |
| 6,935,119 B2 | 8/2005 | Placko et al. | |
| 7,492,304 B1 * | 2/2009 | Woodell | G01S 13/953 342/26 B |
| 7,982,658 B2 | 7/2011 | Kauffman et al. | |
| 8,068,050 B2 | 11/2011 | Christianson | |
| 8,228,227 B2 | 7/2012 | Bunch et al. | |
| 8,452,516 B1 | 5/2013 | Rose et al. | |
| 8,490,404 B1 | 7/2013 | Adibhatla et al. | |
| 8,869,537 B2 | 10/2014 | Geis et al. | |
| 8,902,100 B1 * | 12/2014 | Woodell | G01S 7/04 324/74 |
| 9,221,548 B1 | 12/2015 | Sishtla et al. | |
| 9,244,166 B1 | 1/2016 | Finley et al. | |
| 2009/0025393 A1 * | 1/2009 | Sheldon | B64D 33/02 60/725 |
| 2013/0234884 A1 * | 9/2013 | Bunch | G01W 1/00 342/26 B |
| 2013/0255221 A1 | 10/2013 | Gaully et al. | |
| 2016/0011334 A1 | 1/2016 | Khatwa et al. | |
| 2016/0230677 A1 | 8/2016 | Feulner et al. | |
| 2016/0274271 A1 | 9/2016 | Lukas et al. | |

OTHER PUBLICATIONS

Zhang et al., "A Method for Estimating Rain Rate and Drop Size Distribution from Polarimetric Radar Measurements," IEEE Transactions on Geoscience and Remote Sensing, vol. 39, No. 4, Apr. 2001, pp. 830-841.

Cao et al., "Analysis of Video Disdrometer and Polarimetric Radar Data to Characterize Rain Microphysics in Oklahoma," Journal of Applied Meteorology and Climatology, vol. 47, Aug. 2008, pp. 2238-2255.

Non-Final Office Action issued in connection with related U.S. Appl. No. 14/927,709 dated Jun. 1, 2017.

Great Britain Combined Search and Examination Report issued in connection with related GB Application No. 1617979.8 dated Mar. 22, 2017.

* cited by examiner

ENHANCING ENGINE PERFORMANCE TO IMPROVE FUEL CONSUMPTION BASED ON ATMOSPHERIC ICE PARTICLES

FIELD OF THE INVENTION

The present subject matter relates generally to enhancing engine performance of an aircraft.

BACKGROUND OF THE INVENTION

An aircraft can include an engine, such as a gas turbine engine, for propulsion of the aircraft. A gas turbine engine can include a fan and a core arranged in flow communication with one another. The core of the gas turbine engine generally includes an air flow path having, in serial air flow order, a compressor section, a combustion section, a turbine section, and an exhaust section. The compressor section can include one or more compressors used to compress air. The compressed air can be provided to the combustion section where it is mixed with fuel and burned to provide combustion gases. The combustion gases can be used to support operation of the compressor section and the turbine section of the gas turbine engine.

During flight, an aircraft may encounter solid water in the form of ice crystals (e.g., from cirrus clouds) in the flight path of the aircraft. Large amounts of ice water ingested by the aircraft engine can be problematic as energy is expended to convert the water to vapor during the combustion process. This can lead to increased fuel consumption of the engine when solid water in the form of ice crystals is in the flight path of the aircraft.

Variable bleed valves associated with the aircraft engine can be opened in response to the detection of ice crystals. Opening of the variable bleed valves can lead to increased fuel consumption of the aircraft engine. Current methods using estimates of ice content based on one or more temperature sensors can cause the variable bleed valves to open for more time than needed due to uncertainty in the ice content estimate. The impact of opening the variable bleed valves on fuel consumption can be large.

BRIEF DESCRIPTION OF THE INVENTION

Aspects and advantages of embodiments of the present disclosure will be set forth in part in the following description, or may be learned from the description, or may be learned through practice of the embodiments.

One example aspect of the present disclosure is directed to a method of controlling an aircraft engine. The method includes identifying, by one or more processors, one or more points along a flight path of an aircraft. The method further includes receiving, by the one or more processors, a reflectivity measurement for each of the one or more points obtained using a device located on the aircraft. The method further includes determining, by the one or more processors, an estimate of ice water content for each of the one or more points based at least in part on the reflectivity measurement for the point; and controlling, by the one or more processors, at least one component of the aircraft engine based at least in part on the estimate of ice water content the one or more points.

Other example aspects are directed to control systems, devices, aircraft, apparatus, and other systems configured to control at least one component of an engine based at least in part on an estimate of ice water content. Variations and modifications can be made to these example aspects of the present disclosure.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION OF THE INVENTION

Figure 1:
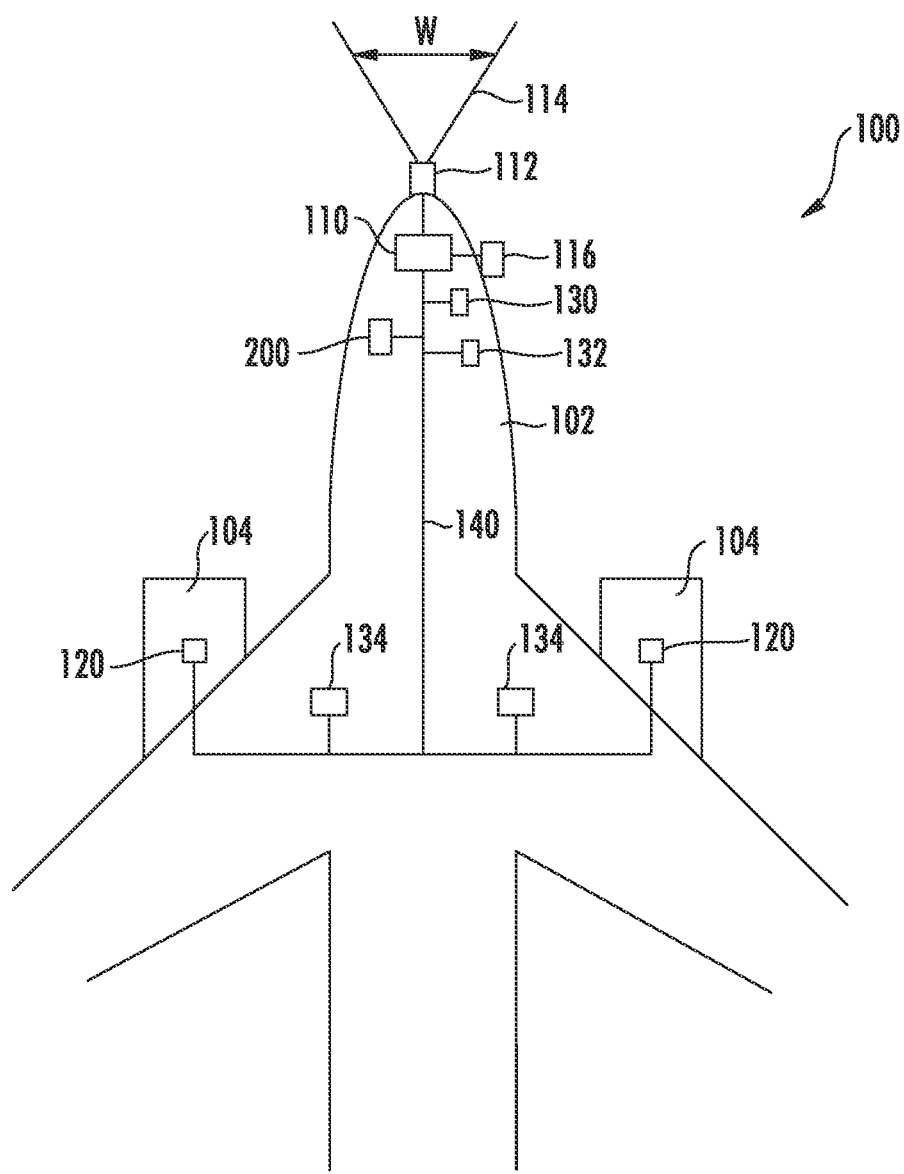
FIG. 1 depicts an overview of an example system according to example embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Example aspects of the present disclosure are directed to systems and methods for improving engine performance by detecting ice content in the flight path of an aircraft. More particularly, solid water in the form of ice crystals in the flight path of the aircraft can be detected using reflectivity measurements obtained by a device (e.g., a radar device) located on the aircraft. An ice water content estimation algorithm can be used to estimate the ice water content (e.g., in units of grams of mass per meter cubed of volume $g/m^3$) based on reflectivity measurement for points along the flight path of the aircraft. One or more components (e.g., variable bleed valves) of the aircraft engine can be controlled based on the estimated ice water content to improve fuel flow of the aircraft.

More particularly, the systems and methods according to example aspects of the present disclosure can estimate ice water content for points along the flight path of the aircraft based on reflectivity measurements. For instance, points along the flight path to be encountered by the aircraft within a specified time period (e.g., points to be traversed by the aircraft within the next minute) can be identified at a particular resolution. Reflectivity measurements can be obtained for the identified points.

An estimate of ice water content for each of the identified points can be determined based on the reflectivity measurements using an ice water content estimation algorithm. In some embodiments, the estimate of ice water content is determined for each of the one or more points based at least in part on the reflectivity measurement and an ambient temperature measurement obtained from an ambient temperature sensor located on the aircraft. For instance, a model correlating ice water content with reflectivity measurements and ambient temperature can be accessed and used to determine the estimate of ice water content.

In some embodiments, a plurality of estimated values for each point can be obtained as the aircraft travels along the flight path. Each estimated value can be associated with an instance of a reflectivity measurement. The estimate of ice water content can be refined as the aircraft travels along the flight path from the plurality of estimated values using a weighted averaging function. The weighted averaging function can assign greater weight to estimated values associated with reflectivity measurements for points closer to the aircraft as the reflectivity measurements are typically more accurate. In this way, the estimate of ice water content can be continuously improved as the aircraft moves closer to the point.

Once the estimate of ice water content is obtained, the estimate can be used to control one or more components associated with the aircraft engine, for instance, to improve fuel performance. For instance, the opening and closing of one or more variable bleed valves associated with the aircraft engine can be controlled based at least in part on the estimate of ice water content to improve fuel performance of the aircraft engine.

In this way, example aspects of the present disclosure can have a technical effect of providing for improved performance of an aircraft engine when the aircraft encounters ice in the flight path of the aircraft. Providing more efficient control of the aircraft engine (e.g., more efficient control of the variable bleed valves) based on improved estimates of ice water content can lead to increased efficiency in fuel consumption, potentially leading to fuel savings for operation of the aircraft. In addition, the estimation of ice water content according to example aspects of the present disclosure can be performed using devices located on many different types of aircraft, resulting in wide range applicability for use by aircraft in improving engine performance.

FIG. 1 depicts an example system 100 for controlling one or more components of an aircraft engine to improve engine performance according to example aspects of the present disclosure. As shown, the system 100 can include a control system having one or more computing device(s) 200 (e.g., a computer based control system) or other control equipment associated with, for instance, an avionic system of the aircraft 102. The computing device(s) 200 can be coupled to a variety of systems on the aircraft 102 over a communications network 140. The communications network 140 can include a data bus and/or combination of wired and/or wireless communication links.

The system 100 can include a radar device 112 associated with the aircraft 102. The radar device 112 can be configured to obtain radar reflectivity measurements. The radar device 112 can emit a radar beam 114 (e.g., radio waves) and measure reflectivity of the radar beam 114 off of objects (e.g., ice water particles) in the flight path of the aircraft 102.

The radar device 112 can emit a radar beam 114 having a radar beam width W as illustrated in FIG. 1. The radar device 112 can obtain reflectivity measurements in dBZ (e.g., decibel relative to Z). These reflectivity measurements can compare the equivalent reflectivity (Z) of a radar signal to the return of a droplet of rain with a diameter of 1 mm. In some embodiments, the radar device 112 can be associated with an onboard weather system 110 for the aircraft 102. In some embodiments, the radar device 112 can be an X-band radar device (e.g., associated with a frequency range of 7.0 to 11.2 gigahertz (GHz)).

The present disclosure is discussed with reference to performing reflectivity measurements using a radar device located on the aircraft for purposes of illustration and discussion. Those of ordinary skill in the art, using the disclosure provided herein, will understand that other types of devices can be used to obtain the reflectivity measurements. For instance, a lidar device or other reflectivity based technology can be used to obtain the reflectivity measurements.

The system 100 can further include a temperature sensor 116 associated with the aircraft 102. The temperature sensor 116 can measure the ambient temperature around the aircraft 102 while the aircraft is in flight. Similar to the radar device 112, the ambient temperature sensor 116 can be associated with the onboard weather system 110 for the aircraft 102.

According to example embodiments of the present disclosure, the computing device(s) 200 can access data from the onboard weather system 110 (e.g., radar reflectivity measurements and ambient temperature data) and use the data to control one or more components of the aircraft to increase fuel performance. More particularly, the computing device(s) 200 can control components associated with aircraft engines 104 (e.g., variable bleed valves) to increase fuel performance based on the data accessed, for instance, from the onboard weather system 110.

More particularly, as illustrated in FIG. 1, the computing device(s) 200 can be in communication with engine control systems 120 associated with the aircraft engines 104. Aircraft engines 104 can be, for instance, gas turbine engines. The engine control systems 120 can be configured to control components of the aircraft engines 104 in response to commands from the computing device(s) 200. In one embodiment, the engine control systems 120 can control variable bleed valves associated with the aircraft engines 104 to open and close based on commands from the computing device(s) 200. The commands from the computing device(s) 200 can be determined based at least in part on the radar reflectivity measurements obtained by the radar device 112 as will be discussed more detail below.

In some embodiments, the computing device(s) 200 can be in communication with other aircraft systems over the communications network 140. The aircraft systems can include, for instance a display system 130 including one or more display devices that can be configured to display or otherwise provide information generated or received by the system 100 to operators of the aircraft 102. The display system 130 can include a primary flight display, a multipurpose control display unit, or other suitable flight display commonly included within a cockpit of the aircraft 102. By way of non-limiting example, the display system 130 can be used for displaying flight information such as airspeed, altitude, attitude, and bearing of the aircraft 102.

The computing device(s) 200 can also be in communication with a flight control computer 132. The flight control computer 132 can, among other things, automate the tasks of piloting and tracking the flight plan of the aircraft 102. The flight control computer 132 can include or be associated with, any suitable number of individual microprocessors, power supplies, storage devices, interface cards, auto flight systems, flight management computers, and other standard components. The flight control computer 132 can include or cooperate with any number of software programs (e.g., flight management programs) or instructions designed to carry out the various methods, process tasks, calculations, and control/display functions necessary for operation of the aircraft 102. The flight control computer 132 is illustrated as being separate from computing device(s) 200. Those of ordinary skill in the art, using the disclosures provided herein, will understand that the flight control computer 132 can also be included with or implemented by the computing device(s) 200.

The computing device(s) 200 can also be in communication with various other aircraft systems 134. The aircraft systems 134 can include, for instance, digital control systems, throttle systems, inertial reference systems, flight instrument systems, auxiliary power systems, fuel monitoring system, engine vibration monitoring systems, communications systems, flap control systems, flight data acquisition systems, and other systems.

Figure 2:
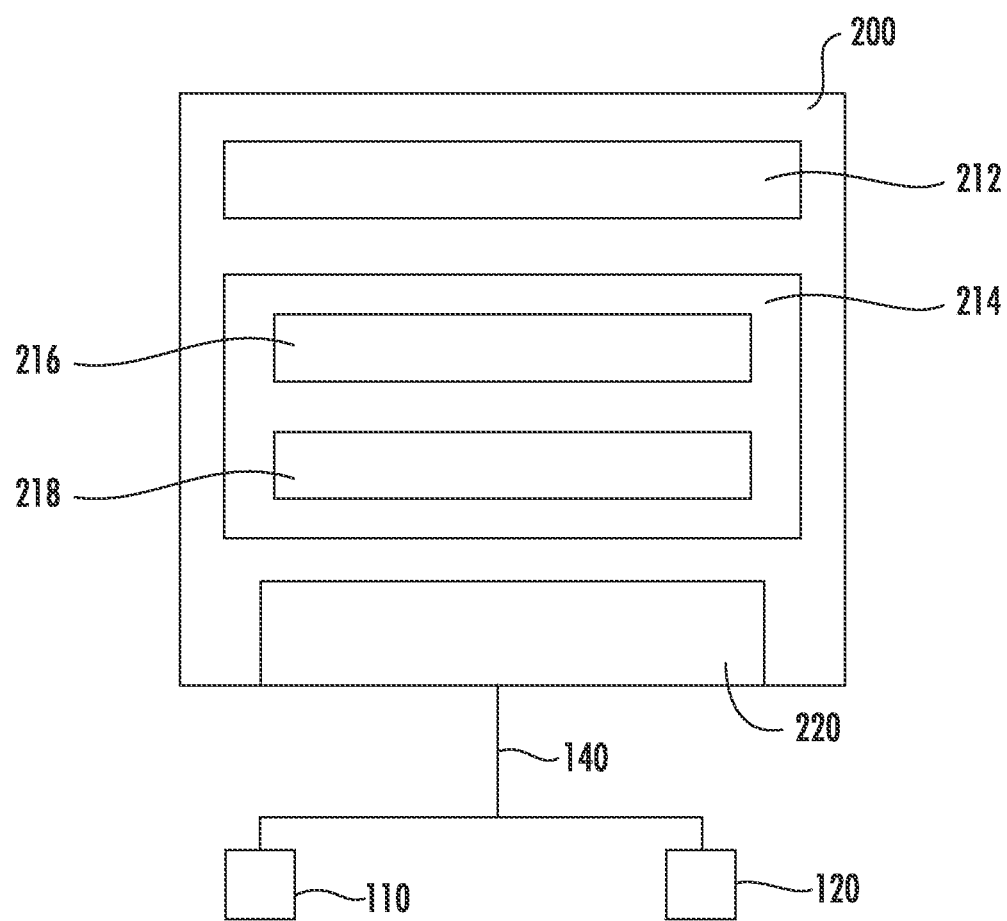
FIG. 2 depicts an example computing device used in a control system according to example embodiments of the present disclosure.

FIG. 2 depicts various components of the computing device(s) 200 according to example embodiments of the present disclosure. As shown, the computing device(s) 200 can include one or more processors 212 and one or more memory devices 214. The one or more processors 212 can include any suitable processing device, such as a microprocessor, microcontroller, integrated circuit, logic device, or other suitable processing device. The one or more memory devices 214 can include one or more computer-readable media, including, but not limited to, non-transitory computer-readable media, RAM, ROM, hard drives, flash drives, or other memory devices.

The one or more memory devices 214 can store information accessible by the one or more processors 212, including computer-readable instructions 216 that can be executed by the one or more processors 212. The instructions 216 can be any set of instructions that when executed by the one or more processors 212, cause the one or more processors 212 to perform operations. The instructions 216 can be implemented in software written in any suitable programming language or can be implemented in hardware. In some embodiments, the instructions 216 can be executed by the one or more processors 212 to cause the one or more processors to perform operations, such as the operations for determining ice water content and controlling one or more components of an aircraft engine (e.g., Variable bleed valves) as described with reference to FIG. 3.

Referring to FIG. 2, the memory devices 214 can further store data 218 that can be accessed by the processors 212. The data 218 can include, for instance, radar reflectivity data, ambient temperature measurements, estimated ice water content, and other data. The data 218 can also include data associated with models and algorithms used to perform the example methods according to example aspects of the present disclosure, such as models and algorithms for estimating ice water content.

The computing device(s) 200 can further include a communications interface 220. The communications interface 220 can be configured to communicate with aircraft systems over a communication network, such as communications network 140 of FIG. 1. For instance, the communications interface 220 can receive radar reflectivity measurements and ambient temperature measurements from an onboard weather system 110. The communications interface 220 can provide control commands to engine control systems 120. The communications interface 220 can include any suitable components for interfacing with one more other devices, including for example, transmitters, receivers, ports, controllers, antennas, or other suitable components.

The technology discussed herein makes computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, processes discussed herein may be implemented using a single computing device or multiple computing devices working in combination. Databases, memory, instructions, and applications may be implemented on a single system or distributed across multiple systems. Distributed components may operate sequentially or in parallel.

Figure 3:
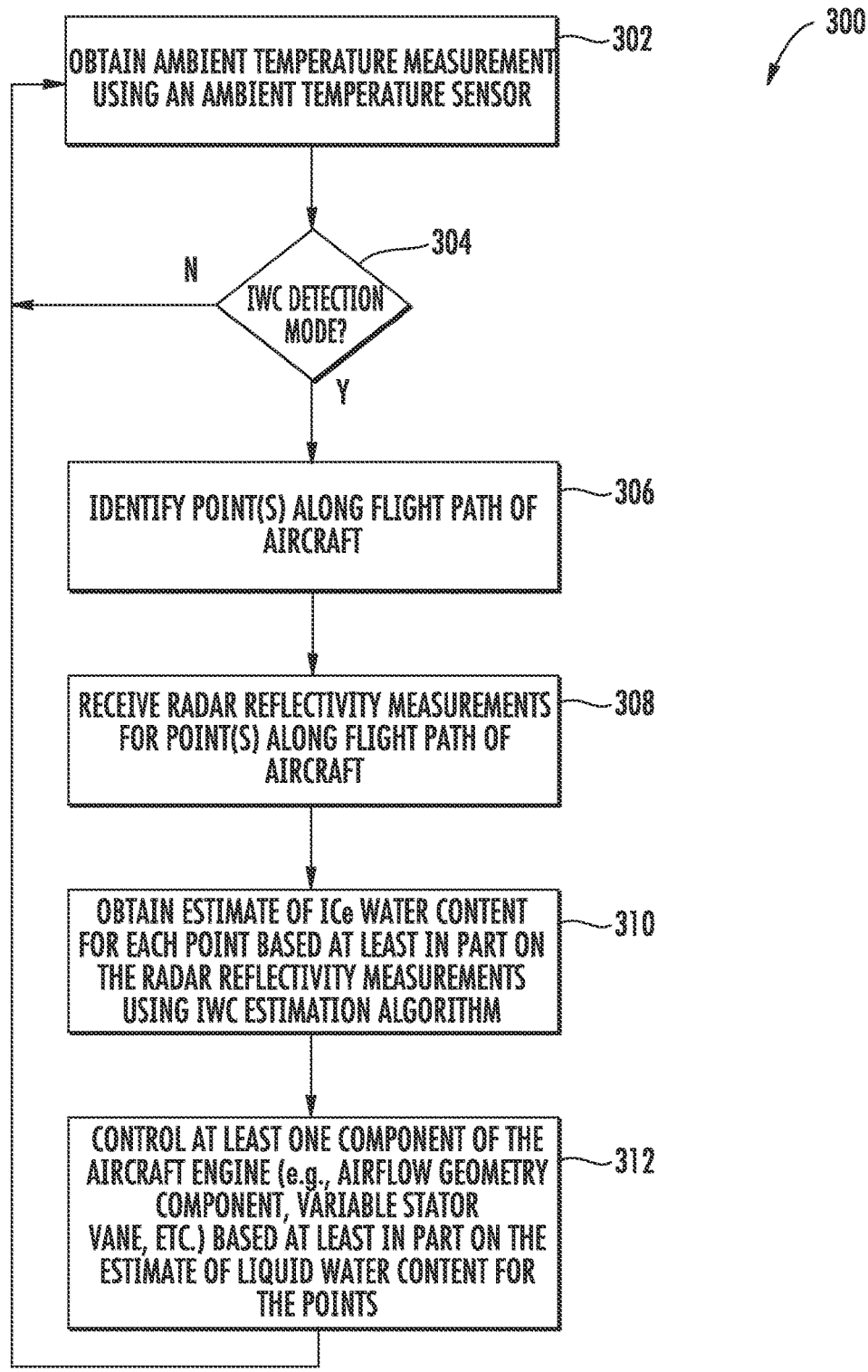
FIG. 3 depicts a flow diagram of an example method according to example embodiments of the present disclosure.

FIG. 3 depicts a flow diagram of an example method (300) according to example embodiments of the present disclosure. The method (300) can be implemented using one or more computing devices, such as the computing device(s) 200 of FIGS. 1 and 2. The method or portion of the method can be implemented at least in part by other devices, such as processors associated with the radar device 112 or other component(s) without deviating from the scope of the present disclosure. In addition, FIG. 3 depicts steps performed in a particular order for purposes of illustration and discussion. Those of ordinary skill in the art, using the disclosures provided herein, will understand that various steps of any of the methods disclosed herein can be modified, rearranged, omitted, expanded, and/or adapted in various ways without deviating from the scope of the present disclosure.

At (302), the method includes obtaining an ambient temperature measurement using an ambient temperature sensor. For instance, an ambient temperature measurement from the ambient temperature sensor 116 equipped on the aircraft 102 can be accessed. The ambient temperature measurement can be obtained from other suitable sources without deviating from the scope of the present disclosure. For instance, the ambient temperature measurement can be based on data stored in an onboard weather system for the aircraft.

At (304), the method determines whether to engage an ice water content detection mode based on the ambient temperature measurement. For instance, when the ambient temperature measurement is less than a threshold ambient temperature, the method can include engaging the ice water content detection mode to control the aircraft based on detected ice water content as will be discussed in more detail below. Otherwise, the method can continue to monitor the ambient temperature until the ambient temperature measurement is less than the ambient temperature threshold.

As discussed above, an aircraft is likely to encounter ice water in the atmosphere at altitude where the ambient temperature is 0° C. or less. Accordingly, in one embodiment, the method can include engaging the ice detection mode when the ambient temperature measurement is less than about 0° C. Other suitable thresholds can be used without deviating from the scope of the present disclosure. For instance, the threshold can be about −10° C., −5° C., −2.5° C., or other suitable threshold without deviating from the scope of the present disclosure. As used herein, the use of the term "about" in conjunction with an numerical value is intended to refer to within 30% of the numerical value.

When the ice water detection mode is engaged, the method can include identifying one or more points along the flight path of the aircraft as shown at (306) of FIG. 3. More particularly, from the current flight path, one or more points (e.g., each associated with a latitude/longitude/altitude) can be selected from along the flight path of the aircraft at an arbitrary resolution value. The resolution value can be indicative of the number of points and/or spacing of points to be identified along the flight path The identified points can be within the radar beam width associated with radar device equipped on the aircraft. The points can be selected in a range corresponding to a time period in which the minimum is associated with the nearest point for which a radar reflectivity measurement can be obtained and the maximum is a point estimated to be encountered by the aircraft a certain time period ahead in the flight path (e.g., encountered by the aircraft within the 1 minute along the flight path) provided that point falls within the radar beam width.

Figure 4:
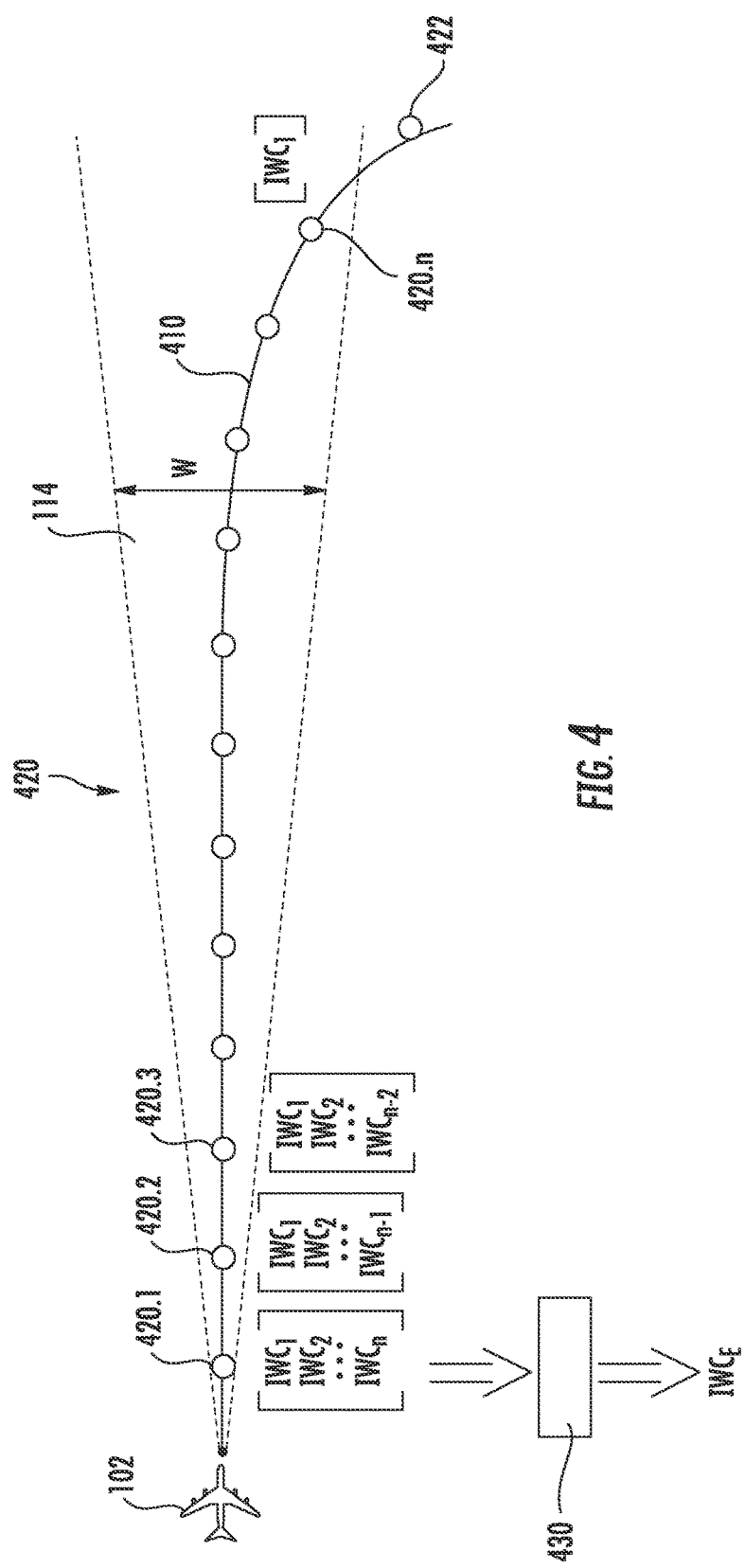
FIG. 4 depicts the example determination of ice water content for a plurality of points using reflectivity measurements according to example embodiments of the present disclosure.

For example, FIG. 4 depicts a plurality of points 420 identified along a flight path 410. The plurality of points 420 are represented as dots along the line corresponding to the flight path 410. The points 420 can each be associated with a latitude/longitude/altitude). The resolution of points 420 can be identified according to any suitable resolution value. The points 420 can be within a radar beam width W associated with the radar beam 114 emitted by the radar device 112 equipped on the aircraft 102. For instance, point 422 along the flight path is outside the radar beam width W of the radar beam W emitted by the radar device 112 equipped on the aircraft and, in some embodiments, is not identified for inclusion in the plurality of points.

Referring to FIG. 3 at (308), the method can include receiving radar reflectivity measurements for each of the one or more points along the flight path of the aircraft. For instance, a radar reflectivity measurement (e.g., in dBZ) can be obtained for each of the points 420 along the flight path 410 of aircraft 102.

At (310) of FIG. 3, the method includes determining an estimate of ice water content for the point(s) based at least in part on the radar reflectivity measurements for the points. The estimate of ice water content can also be based on other data, such as reflectivity measurements obtained from other sources (e.g., other aircraft) and/or weather data obtained from a weather surface. In one example embodiment, the radar reflectivity measurement for each point can be provided to an ice water content estimation algorithm which can generate an estimated value for the point. Details concerning an example ice water content estimation algorithm will be discussed below with reference to FIG. 5.

In a particular implementation, the determination of ice water content for each of the plurality of points can be determined continuously to give a path-wise array of ice water content in the air mass ahead of the aircraft. For instance, a set of estimated values for each of the one or more points can be determined as the aircraft travels along the flight path. Each estimated value can be associated with an instance of the radar reflectivity measurement for the point and can be determined using the ice water content estimation algorithm. This can build a set of estimated values for the points along the flight path with the nearest point having the most estimated values and the farthest point having only one value.

For example, as shown in FIG. 4, the nearest point 420.1 can have ice water content estimated values $IWC_1$, $IWC_2$, ... $IWC_N$. The next nearest point 420.2 can have one less estimated value than the nearest point 420.1. More particularly, the next nearest point 420.2 can have ice water content estimated values $IWC_1$, $IWC_2$, ... $IWC_{N-1}$. The next nearest point 420.3 can have one less estimated value than the nearest point 420.2. More particularly, the next nearest point 420.2 can have ice water content estimated values $IWC_1$, $IWC_2$, ... $IWC_{N-2}$. The next nearest point can have one less estimated value than 420.3, and so forth. The farthest point 420.$n$ can have one estimated value $IWC_1$.

For each point, a weighted averaging function can be applied to the estimated values to determine the estimate of ice water content for the point. For instance, as shown in FIG. 4, the estimated values $IWC_1$, $IWC_2$, ... $IWC_N$ can be provided to a weighted averaging function 430 to determine an estimate of ice water content $IWC_E$ for the point 420.1. The weighted averaging function 430 can assign greater weight to estimated values associated with more accurate radar reflectivity measurements. For instance, the weighted averaging function 430 can assign greater weight to estimated values for instances of the radar reflectivity measurements obtained for points closer to the aircraft.

Referring to FIG. 3 at (312), the method can include controlling at least one component of the aircraft engine based at least in part on the estimate of ice water content for the points. For example, in one embodiment, one or more variable bleed vales associated with the aircraft engine can be adjusted based on the estimate of ice water content to adjust the airflow pressure in the aircraft engine to accommodate for the presence of ice water content in the airflow path and to improve fuel consumption. As one example, a variable bleed valve associated with the aircraft engine can be adjusted to be open when the estimate of ice water content exceeds a threshold. The variable bleed valve can be controlled to close when the estimate of ice water content falls below the threshold.

Figure 5:
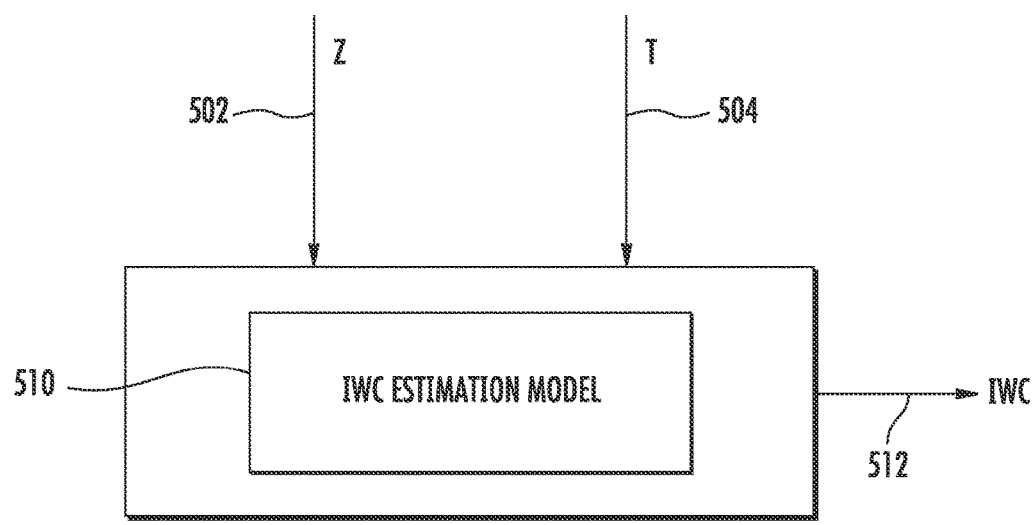
FIG. 5 depicts an overview of an example ice water content estimation algorithm according to example embodiments of the present disclosure.

FIG. 5 depicts an overview of an example ice water content estimation algorithm according to example aspects of the present disclosure. As shown, an ice water content estimation model 510 can be accessed. The model 510 can correlate ice water content 512 for a point with the radar reflectivity measurement 502 for the point and an ambient temperature measurement 504. In some embodiments, the model 510 can take the form of:

$$\mathrm{Log}(IWC)=a*Z+b*T+c$$

where IWC is the estimate of ice water content, Z is the radar reflectivity measurement (e.g., in dBZ), and T is the ambient temperature measurement (e.g., in ° C.). a, b, and c are constants. The values for a, b, and c can be determined, for instance, using a best-fit polynomial equation for a theoretical dataset of ice water content. In some embodiments, the model can be determined as:

$$\log(IWC)=0.03403*Z-0.01799*T-2.661$$

As demonstrated in FIG. 5, radar reflectivity measurements 502 and ambient temperature measurements 510 can be used to evaluate the model 510 to determine the estimate of ice water content.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of controlling an aircraft engine, comprising:
identifying, by one or more processors, one or more points along a flight path of an aircraft;
accessing, by the one or more processors, reflectivity measurements for each of the one or more points, the reflectivity measurements obtained using a radar on the aircraft;
determining, by the one or more processors, a set of estimated ice water content values for each of the one or more points as the aircraft travels along the flight path, each of the estimated values being a correlation of an instance of the reflectivity measurements for the point and an ambient temperature measurement with the point obtained via a sensor;
determining, by the one or more processors, an estimate of ice water content for each of the one or more points by applying a weighted averaging function to the set of estimated ice water content values, wherein the applying assigns a greater weight to the values correlated with the instances of reflectivity measurements obtained for the points closer to the aircraft; and
controlling, by the one or more processors, at least one component of the aircraft engine based at least in part on the estimate of ice water content for the one or more points.

2. The method of claim 1, wherein the at least one component comprises a variable bleed valve associated with the aircraft engine.

3. The method of claim 1, wherein the reflectivity measurement for each of the one or more points comprises a radar reflectivity measurement obtained from a radar device.

4. The method of claim 1, wherein the estimate of ice water content is determined based on the reflectivity measurement using an ice water content estimation algorithm, the ice water content estimation algorithm comprising:
accessing, by the one or more processors, a model correlating ice water content with reflectivity measurements and ambient temperature; and
determining, by the one or more processors, the estimate of ice water content based at least in part on the model.

5. The method of claim 1, wherein controlling, by the one or more processors, at least one component of the aircraft engine based at least in part on the estimate of ice water content is performed when the aircraft is operating in an ice water content detection mode.

6. The method of claim 5, wherein the method comprises:
activating, by the one or more computing devices, the ice water content detection mode based at least in part on the ambient temperature.

7. A system for controlling an aircraft engine of an aircraft, comprising:
a radar device located on the aircraft;
a control system comprising one or more processors and one or more memory devices, the one or more memory devices storing computer-readable instructions that when executed by the one or more processors cause the one or more processors to perform operations, the operations comprising:
selecting a plurality of points along a flight path of the aircraft within a beam width of the radar;
accessing radar reflectivity measurements for each of the plurality of points via the radar device;
determining an initial set of estimated ice water content values for each of the plurality of points as the aircraft travels along the flight path, each of the estimated values being a correlation of an instance of the reflectivity measurements for the point and an ambient temperature associated with the point obtained via a sensor;
determining an estimate of ice water content for each of the plurality of points by applying a weighted averaging function to the set of estimated ice water content values, wherein the applying assigns a greater weight to the values correlated with the instances of reflectivity measurements obtained for the points closer to the aircraft; and
controlling at least one component of the aircraft engine based at least in part on the estimate of ice water content for at least one of the plurality of points.

8. The system of claim 7, wherein the at least one component comprises a variable bleed valve associated with the aircraft engine.

9. The system of claim 7, wherein the estimate of ice water content is determined based on the radar reflectivity measurement using an ice water content estimation algorithm, the ice water content estimation algorithm comprising:
accessing a model correlating ice water content with radar reflectivity measurements and ambient temperature; and
determining the estimate of ice water content based at least in part the model.

10. The system of claim 7, the control system is configured to control the at least one component of the aircraft engine based at least in part on the estimate of ice water content when the control system is operating in an ice water content detection mode, wherein the control system is configured to trigger operation in the ice water content detection mode based at least in part on an ambient temperature measurement.

11. An aircraft, comprising:
an aircraft engine comprising one or more variable bleed valves;
a radar device located on the aircraft;
a control system comprising one or more processors and one or more memory devices, the one or more memory devices storing computer-readable instructions that when executed by the one or more processors cause the one or more processors to perform operations, the operations comprising:
selecting a set of points along a flight path of the aircraft;
receiving radar reflectivity measurements for each point in the set of points;
determining a first set of estimated ice water content values for each point in the set of points as the aircraft travels along the flight path, each of the estimated values being a correlation of an instance of in the each first set of estimated ice water content values is associated with the reflectivity measurements for the point and an ambient temperature measurement with the point obtained via a sensor;
determining an estimate of ice water content for each point in the set of points by applying a weighted averaging function to the set of estimated ice water content values, wherein the applying assigns a greater weight to the values correlated with the instances of reflectivity measurements obtained for the points closer to the aircraft; and controlling at least one component of the aircraft engine based at least in part on the estimate of ice water content for at least one of the plurality of points.

12. The aircraft of claim 11, wherein the at least one component comprises the one or more variable bleed valves associated with the aircraft engine.

13. The aircraft of claim 11, wherein the estimate of ice water content is determined based on the radar reflectivity measurement using an ice water content estimation algorithm, the ice water content estimation algorithm comprising:

accessing a model correlating ice water content with radar reflectivity measurements and ambient temperature; and determining the estimate of ice water content based at least in part the model.

* * * * *